(12) United States Patent
Kurtz

(10) Patent No.: US 11,469,496 B2
(45) Date of Patent: Oct. 11, 2022

(54) REDUCING THE OPTICAL EFFECTS OF DOMES

(71) Applicant: LUMINIT LLC, Torrance, CA (US)

(72) Inventor: Russell Kurtz, Torrance, CA (US)

(73) Assignee: Luminit LLC, Torrance, CA (US)

( * ) Notice: Subject to any disclaimer, the term of this patent is extended or adjusted under 35 U.S.C. 154(b) by 372 days.

(21) Appl. No.: 16/685,160

(22) Filed: Nov. 15, 2019

(65) Prior Publication Data

US 2020/0161752 A1 May 21, 2020

Related U.S. Application Data

(60) Provisional application No. 62/769,974, filed on Nov. 20, 2018.

(51) Int. Cl.
| | |
|---|---|
| *G02B 27/00* | (2006.01) |
| *H01Q 1/42* | (2006.01) |
| *G02B 3/00* | (2006.01) |
| *G02B 13/06* | (2006.01) |
| *G02B 13/16* | (2006.01) |

(52) U.S. Cl.
CPC .............. *H01Q 1/421* (2013.01); *G02B 3/00* (2013.01); *G02B 13/06* (2013.01); *G02B 13/16* (2013.01); *G02B 27/0025* (2013.01); *G02B 2003/0093* (2013.01)

(58) Field of Classification Search
CPC ............ G02B 13/16; G02B 2003/0093; G02B 23/16; G02B 27/0025; G02B 3/00; H01Q 1/421; H01Q 15/08; H01Q 25/007
See application file for complete search history.

(56) References Cited

U.S. PATENT DOCUMENTS

| | | | | |
|---|---|---|---|---|
| 6,028,712 A * | 2/2000 | McKenney | ............ | F41G 7/2253 359/479 |
| 6,462,889 B1 * | 10/2002 | Jackson | ............. | G02B 27/0025 359/728 |
| 7,019,320 B2 * | 3/2006 | Knapp | ............... | G01N 21/0303 250/573 |
| 7,042,654 B2 * | 5/2006 | Knapp | ................... | G02B 13/06 359/708 |
| 8,497,457 B2 * | 7/2013 | Brunton | ................ | F41G 7/2213 244/3.17 |
| 9,335,126 B2 * | 5/2016 | Martin | .................. | F41G 7/2293 |
| 9,347,743 B2 * | 5/2016 | Martin | ................. | G02B 26/101 |
| 2006/0208131 A1 * | 9/2006 | Baumgart | ............... | F42B 10/46 343/872 |
| 2014/0147633 A1 * | 5/2014 | Ashida | ..................... | G02B 3/00 428/156 |
| 2018/0159207 A1 * | 6/2018 | Shurish | ................ | H01Q 1/3233 |

FOREIGN PATENT DOCUMENTS

WO    WO-2016151945 A1 *   9/2016   ......... B29C 45/2708

* cited by examiner

*Primary Examiner* — Vibol Tan
(74) *Attorney, Agent, or Firm* — Lathrop GPM LLP; Laura A. Labeots

(57) ABSTRACT

This application discloses an apparatus for minimizing the optical effects of transmissive domes, and for using the dome surfaces to correct for other optical aberrations and distortions. Herein, the inner surface of the dome is designed to correct for unwanted optical effects of the outer surface of the dome and may also be used to correct for other anticipated effects in the overall optical system.

16 Claims, 6 Drawing Sheets ns and adding

REDUCING THE OPTICAL EFFECTS OF DOMES

CROSS-REFERENCE TO RELATED APPLICATION

This application claims priority to U.S. Provisional Patent Application Ser. No. 62/769,974 filed Nov. 19, 2018, whose disclosure is incorporated herein by reference.

TECHNICAL FIELD

This application is directed to a dome apparatus and a method for shaping a protective dome in order to correct for optical aberrations to the light and/or energy passing into and out of the dome. A specific version of this apparatus uses the curvature of the inside surface of a dome to correct for the lensing and aberration effects of the outside surface of the same dome.

BACKGROUND

Many devices, such as missiles, aircraft, and moving cameras, use hemispherical domes to protect the optical components contained therein (where the term "optical" is understood to apply to any portion of the electromagnetic spectrum). The use of such domes almost always affects the radiation passing through them, usually in ways that have negative effects on the optical performance of the device. Optical correction, both for and by domes, has been a topic of research in recent years, but no practical and successful solutions have appeared to date.

The major optical effect of a dome is a lensing effect. For a typical simple dome having a spherical shape, the main effect is that of a diverging lens, that is, a lens whose focal length is negative. In many instances, a simple dome may be composed of two concentric spherical surfaces, with the radius of curvature of the outside surface being R, the shell having uniform thickness t so that the radius of curvature of the inside surface is R−t. If the dome material has a refractive index of n, then at the center of the dome, its effective focal length is $f=-nR(R-t)/[(n-1)t]$. This has a significant effect on any optical system situated within the dome. In addition, the focal length of such a dome varies with the distance from the center; for example, ellipsoidal domes may produce a diverging lens effect near the center and a converging lens effect nearer to the edges of the field of view.

An additional effect of the dome is optical aberration. In the simplest case, that of the concentric sphere, the dome introduces spherical aberrations at levels that may rival the lensing effects. Other optical aberrations, including coma, astigmatism, and others are more significant farther from the center of the field of view.

Furthermore, there may be known distortions of various types, caused by other optical elements in the system. There may be optical windows, lenses, mirrors, etc. in the system either before or after the dome. Imperfections in these, or in the dome surface, may add distortions that are not easily correctable.

Previous attempts to correct for these aberrations and distortions due to the presence of a dome have included the addition of extra optical elements to the system. This situation substantially increases the complexity and the cost of the system. Furthermore, additional aberrations and distortions can be introduced into the systems by the extra optical elements, which have their own aberrations and distortions.

For example, one unsuccessful attempt at the remediation of dome aberrations pertained to the use of an additional high-order Fresnel lens, which attempted to correct for the optical effects of the dome over a fairly wide portion of the dome width. However, this attempt was extremely limited in the range of useful wavelengths, and was very sensitive to the viewer pointing direction, making it difficult to easily use in a wide variety of environments, especially if the viewing system is on a gimbal.

Another ineffective attempt involved the addition a traditional optical element, albeit with high-order optical surfaces, between the imaging optics and the focal plane. This element requires very high manufacturing precision, resulting in high costs of the system. Also, the additional optical element must be redesigned for each implementation (each combination of dome, imaging system, and wavelength range), further increasing the cost of the system and adding to the design time. This element is also sensitive to spectral range and viewing angle.

Yet another attempt to correct for the optical dome is to refocus the system before the focal plane. Focusing corrections alone may need to be very large if the dome's optical effects are not corrected separately. Thus, there exists a need for an effective solution to the use of domes as optical correction elements, which is addressed by the apparatus described herein.

BRIEF SUMMARY

The present application is directed to an apparatus for the correction of optical or electromagnetic aberrations and distortions through the design of the inside and outside surfaces of a protective dome. It is understood that the shape of the outside surface is usually defined by aerodynamic constraints, so that the inside surface may need to correct for the optical effects of this outside surface. Embodiments of this invention can be used on the front ends of missiles and aircraft.

A specific embodiment of this invention includes an apparatus for the correction of dome aberrations that includes a dome made of a shell having two curved surfaces, such as an outside surface and an inside surface. The inside and outside surfaces of the dome are two separate shapes that combine to form a corrector that improves the quality of the image formed or the information collected by a radiation-collection system underneath the dome. In this embodiment, the dome comprises a material capable of transmitting radiation.

Another embodiment is a method of manufacturing of a dome comprising correcting for the lensing effects of the outside surface of the dome by (a) measuring an outside surface of the dome to obtain a radius of curvature R; (b) measuring a center thickness t of the dome, wherein the dome comprises a material comprising a refractive index n; and (c) manufacturing the inner surface of the dome so that the inside surface of the dome includes a radius of curvature of R−t+t/n.

The dome correction apparatus of this application has several benefits and advantages. One benefit is that the dome manufacturing process will not require large changes in design caused by varying imaging systems or its use in different portions of the electromagnetic spectrum. Another benefit is that there are no additional parts or components required, resulting in manufacturing simplicity and cost reduction.

DETAILED DESCRIPTION OF EXEMPLARY EMBODIMENTS

The present application relates to an apparatus and a method for mitigating the overall lensing effect of a dome and/or for designing and manufacturing the dome's surfaces to correct for optical aberrations and distortions of light and energy passing in and out of the dome. One example of this, specifically using the inside surface of a dome to correct for the lensing effects of the outside surface, is described by FIG. 1. In this embodiment, the two dome surfaces are spherical.

Most existing domes are fabricated with the two spherical surfaces being concentric, so that the thickness is even at all locations on the dome. The outside surface of the dome is described by its radius of curvature, R. The thickness of the dome at its center is t and the refractive index of the dome material is n. In this case, the radius of curvature of the inside surface is R−t.

In contrast, for a corrective dome as claimed herein, the dome includes a shell comprising two curved surfaces, namely an outside surface and an inside surface where the inside and outside surfaces of the dome are of two separate shapes that combine to form a corrector that improves the quality of the image formed or the information collected by a radiation-collection system underneath the dome. Also, the dome comprises a material capable of transmitting radiation.

Figure 1A:
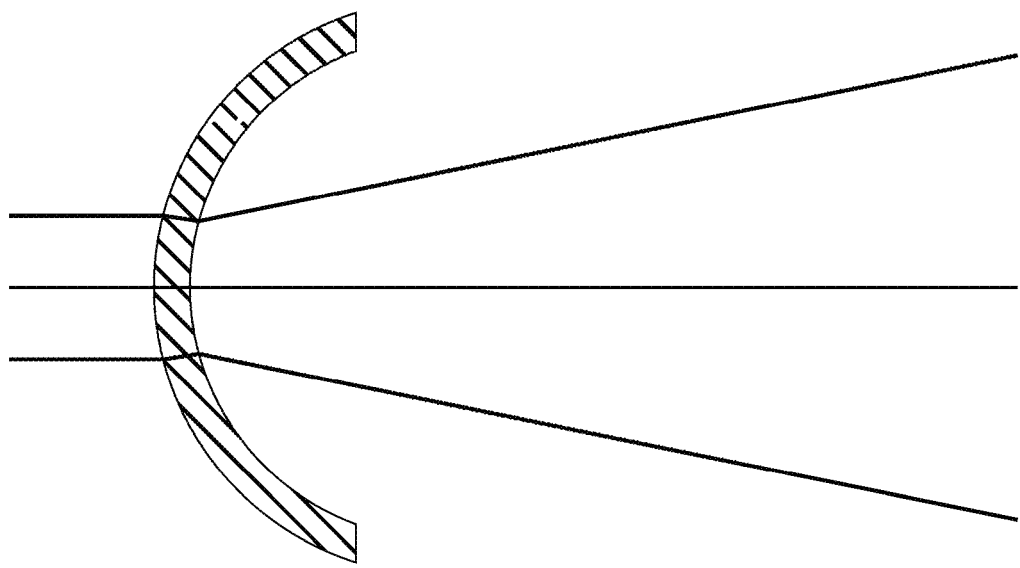
FIG. 1(A) illustrates an apparatus for correcting the optical lensing effects of the dome showing the uncorrected dome.
Figure 1B:
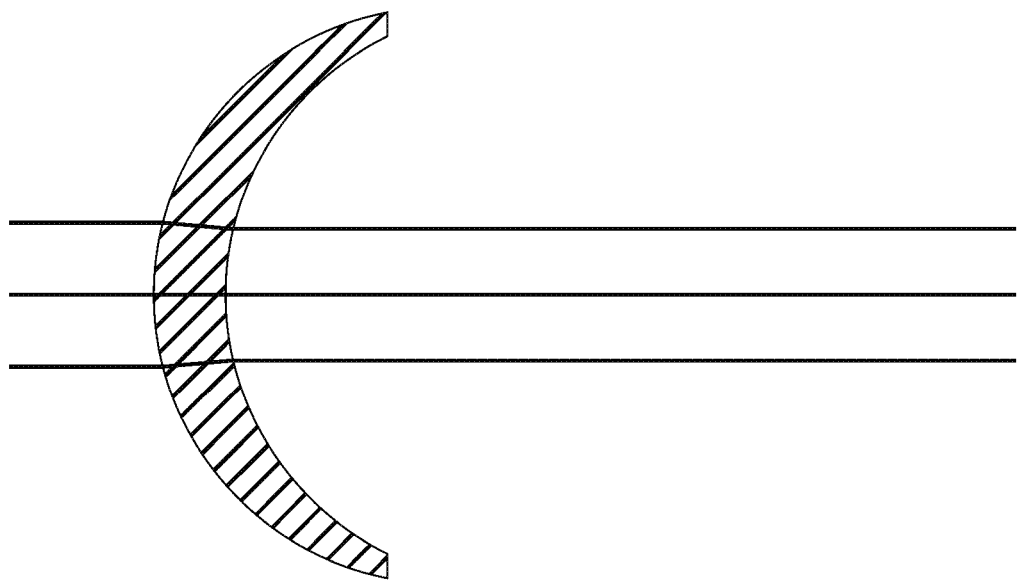
FIG. 1(B) shows the same dome after the inside surface has designed and manufacture to provide appropriate correction.

In one embodiment, the radius of the inside surface is made larger (the surface is less curved) by the amount t/n; the radius of curvature of the inside surface is R−t+t/n. This change converts the dome from acting as a lens whose focal length is $f=-nR(R-t)/[(n-1)t]$ to having no lens effect at all, effectively using the inside surface of the dome to correct for the outside surface of the dome. FIG. 1(A) shows the uncorrected dome and FIG. 1(B) shows the same dome after the inside surface has been designed and manufactured to provide appropriate correction.

Figure 2A:
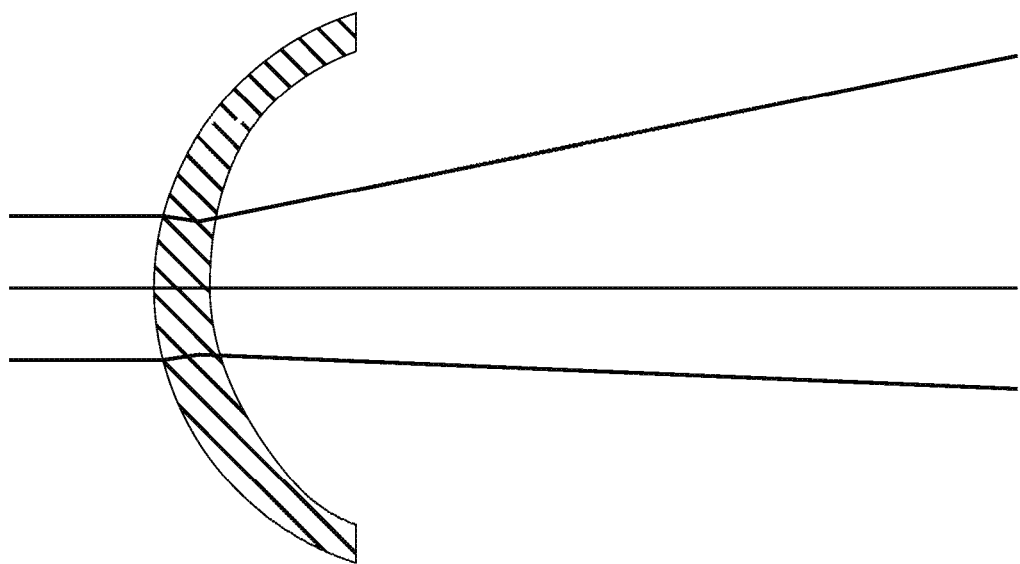
FIG. 2(A) illustrates an apparatus for correcting aberrations and distortions caused by other optical elements or by the shape of the dome's outside surface, showing the dome without correction.
Figure 2B:
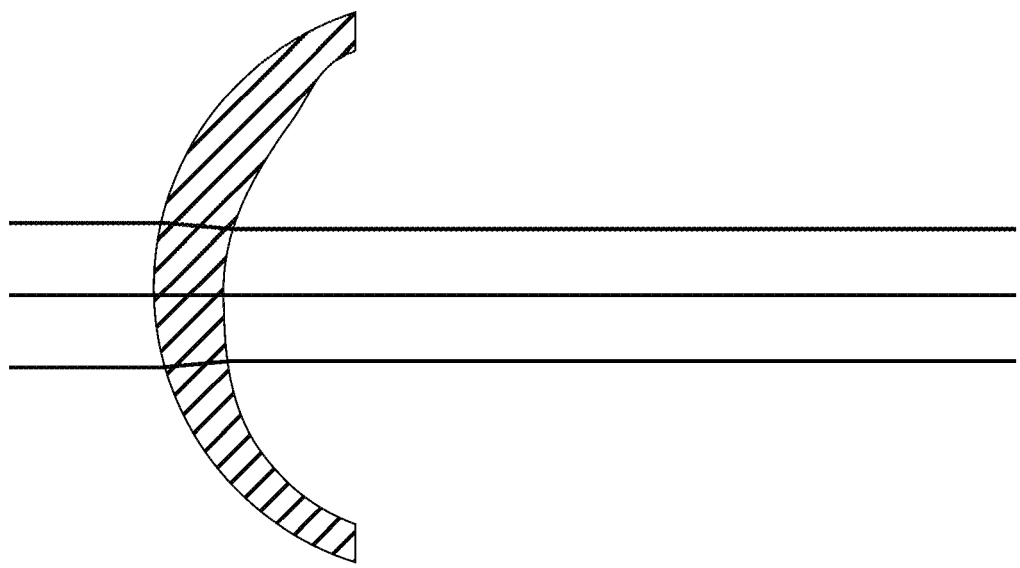
FIG. 2(B) shows the dome when the inside surface has been reshaped to correct for said aberrations and distortions.
Figure 3A:
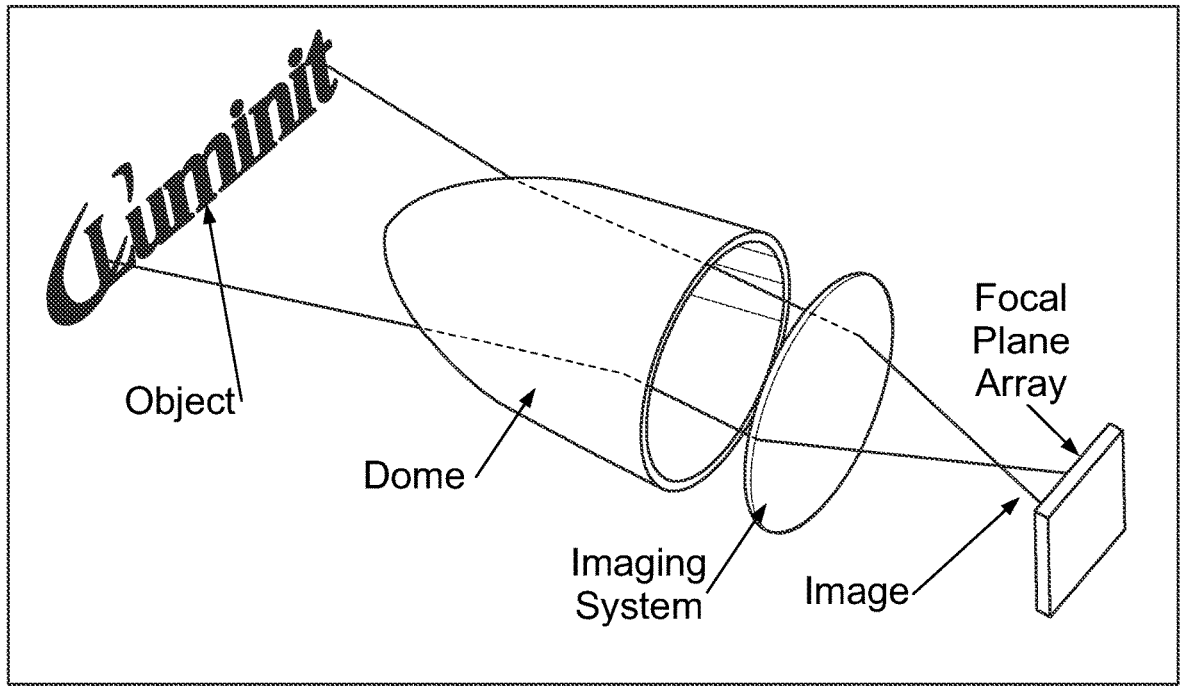
FIG. 3(A) shows a test system that demonstrated the capability of the inside dome to correct for the lensing effects of the outside dome.
Figure 3B:
FIG. 3(B) shows the original object whose image is being viewed by the focal plane in (A).
Figure 3C:
FIG. 3(C) shows the image after passing through the dome.
Figure 3D:
FIG. 3(D) shows the difference between that image and the original.
Figure 3E:
FIG. 3(E) shows the image after passing through the corrected dome.
Figure 3F:
FIG. 3(F) shows the reduced difference between the corrected image and the original.

Another exemplary embodiment is shown in FIG. 2. In this case, the outside surface of the dome and/or other elements in the optical system (whether before or after the dome) cause aberrations and distortions that are not simple or even, potentially, symmetric. The inside surface of the dome is then constructed as a combination of two surface patterns. The overall curvature of the inside surface is used to correct for the lowest-order aberrations of the optical system, such as lensing effects (defocus) and spherical aberration. In addition, the other aberrations and distortions are determined over small, local areas, and these distortions are corrected separately with a surface pattern specifically designed to eliminate them. This pattern is added to the overall curvature as a variation pattern, resulting in the dome correcting additional distortions and aberrations that are not solely defocus and spherical aberration. FIG. 2(A) shows the dome without correction and FIG. 2(B) shows the dome when the inside surface has been reshaped to correct for the aberrations and distortions.

FIG. 3 shows an example dome system that was designed according to the method described herein, which demonstrated the capability of the inside dome to correct for the lensing effects of the outside dome. FIG. 3(A) shows the system layout, FIG. 3(B) shows the original object whose image is being viewed by the focal plane in FIG. 3(A). FIG. 3(C) shows the image after passing through the dome having obvious aberrations. FIG. 3(D) shows the difference between that image and the original. FIG. 3(E) shows the image after passing through the corrected dome and FIG. 3(F) shows the reduced difference between the corrected image and the original.

Figure 4A:
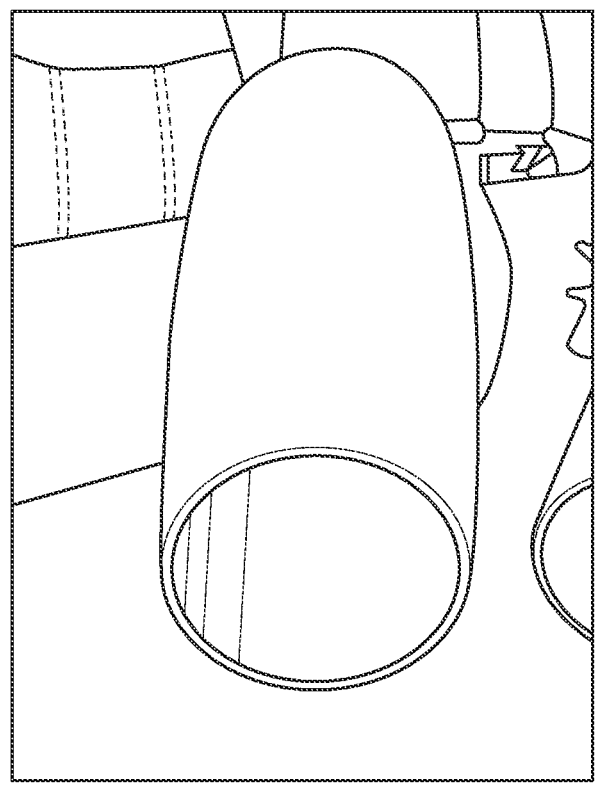
FIG. 4(A) illustrates an example of a dome apparatus, showing an image of the dome.
Figure 4B:
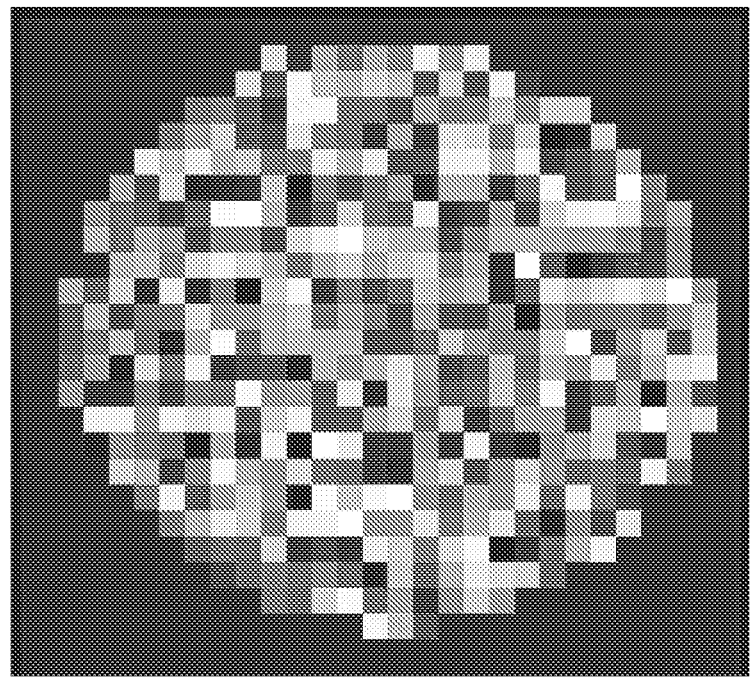
FIG. 4(B) is a portion of the patterning added to the inside surface of the dome for correction, in which the brightness of the image represents the phase shift induced by the dome, with black being no shift and white being a shift of slightly less than one wavelength.

FIG. 4 shows images of an example dome apparatus, wherein FIG. 4(A) is an image of the dome and FIG. 4(B) is a portion of the patterning added to the inside surface of the dome for correction, in which the brightness of the image represents the phase shift induced by the dome, with black being no shift and white being a shift of slightly less than one wavelength.

Figure 5A:
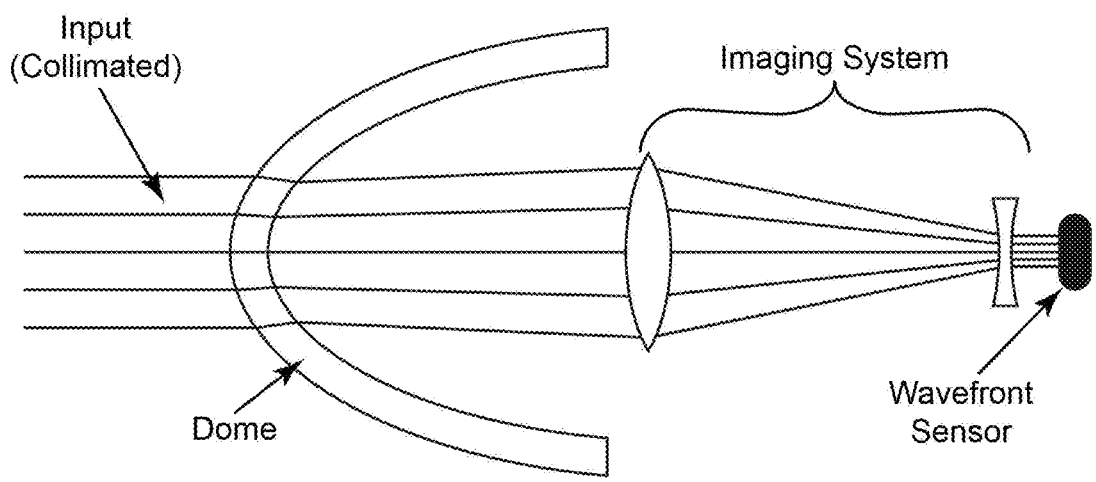
FIG. 5(A) illustrates the corrected dome apparatus's capability to reduce aberration, showing the optical path of the measurement system with the dome in place.
Figure 5B:
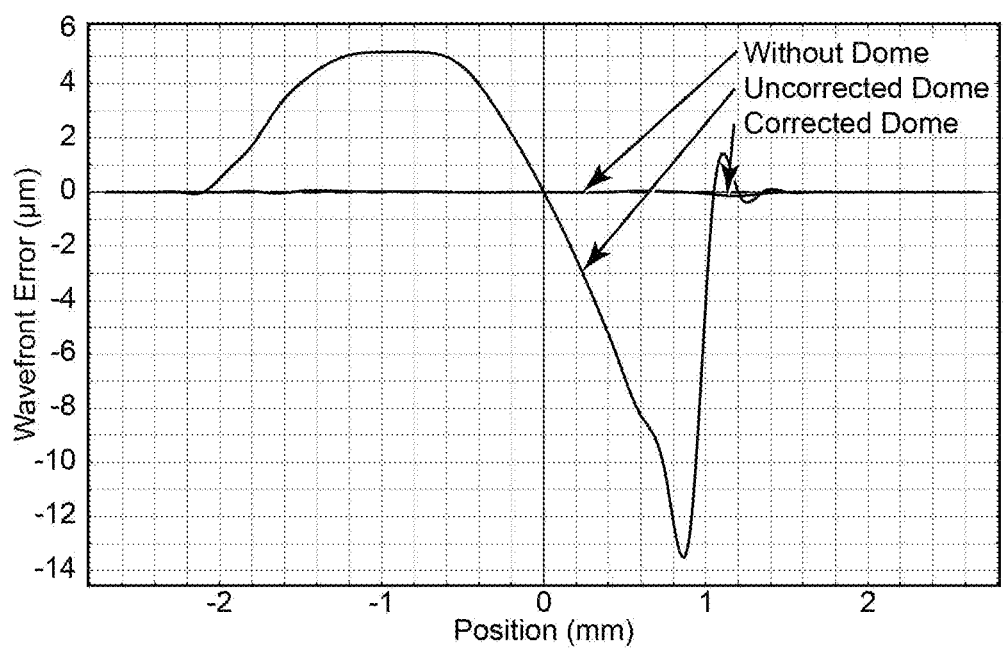
FIG. 5(B) compares the lack of aberrations when the dome is absent (dashed line), the aberration (in terms of wavefront error) when the dome is in place, and the (small) residual aberration when the correction has been added to the dome.
Figure 5C:
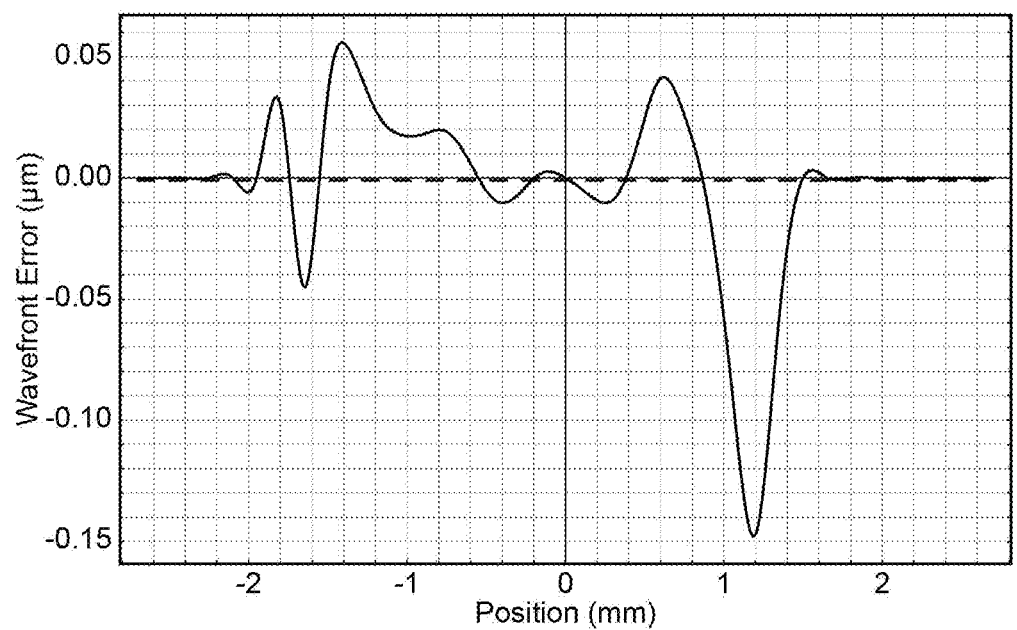
FIG. 5(C) shows just the zero aberration without the dome (dashed line) and the residual aberration after correction, using a scale that is 1,000 times smaller than (B).

FIG. 5 illustrates the corrected dome's capability to reduce aberration, wherein FIG. 5(A) shows the optical path of the measurement system with the dome in place; FIG. 5(B) compares the lack of aberrations when the dome is absent (dashed line), the aberration (in terms of wavefront error) when the dome is in place, and the (small) residual aberration when the correction has been added to the dome; and FIG. 5(C) shows just the zero aberration without the dome (dashed line) and the residual aberration after correction, using a scale that is 1,000 times smaller than FIG. 5(B).

The dome can be composed of one piece (monolithic) as shown in FIG. 4(A), or can be composed of multiple pieces. The dome can be comprised of multiple domes and/or multiple shells that are attached to each other or not. The dome can be composed of multiple sheets or layers having gaps of air, gas, fluid, or vacuum in between the layers. The domes can be one layer in one section and multiple layers in other sections. The dome can include one or multiple panes. The dome can have a uniform thickness or be of varying or uneven thicknesses at one or more locations on the dome, depending upon the energy or light involved. The thickness of the dome can range from 0.3 mm to 300 mm but other thicknesses can be possible depending upon the specific application at hand. The thickness and material of the dome are selected both for their optical properties and for structural strength.

The dome can be a spheroidal shape, an ellipsoidal shape, or an ogive shape. In one embodiment, the inside surface of the dome has a shape that counteracts aberrations or distortions induced by the outside surface of the dome. In another embodiment, the dome surfaces comprise conic sections. In yet another embodiment, the dome surfaces comprise conic sections that are concentric. In still another embodiment, at least one dome surface comprises a three-dimensional function that is not a conic section. In another embodiment, at least one of the dome surfaces comprises a localized function applied as a variation to an overall shape function.

The outside surface of the dome can be designed for aerodynamic properties, imaging, or radiation-collection properties or a mixture thereof. In addition, the dome can include a material comprising enhanced reflection, transmission, absorption, or mixtures thereof across some part of the electromagnetic spectrum. In another embodiment, the dome comprises an inside surface constructed as a combination of one or more surface patterns.

Also, the dome material can be ultraviolet light blocking, infrared light blocking, and/or visible light blocking. The dome can be transparent or opaque. In addition, the dome can be chemically inert. The dome can be made of a glass, a ceramic, a crystalline, or a plastic material and can further include one or more coatings on the inside surface and/or outside surface. The coating can be protective, reflective, or transmissive. The glass can be amorphous or crystalline or a combination thereof. According to an exemplary embodiment, the glass material includes silica. In some embodiments, the silica content is at least 10 weight percent, at least 50 weight percent, at least 70 weight percent, at least 80 weight percent, at least 85 weight percent of the total composition of the glass material, and/or no more than 99 weight percent of the total composition of the glass material.

In another embodiment, the glass material includes at least 1 weight percent titanium, such as at least 3 weight percent, at least 5 weight percent, at least 7 weight percent of the total composition of the glass material, and/or no more than 20 weight percent. The glass material may include tantalum and/or niobium dopants, other transition metal dopants (e.g., dubnium, vanadium), alone or in addition to fluorine or boron dopants, or other dopants, such as sodium, potassium, magnesium, calcium, lithium, other alkaline earth metals, or alkali metals, or any combinations of such dopants. Alternate dopants such as iron, copper, tungstates, and or alkali tungsten bronzes are also contemplated. Other oxides, including zirconia and titania, and similar compounds, including zinc sulfide and zinc selenide, may be included. The glass may include a nanocomposite mixture of a plastic, and the dome may be fabricated using sol-gel methods. In one embodiment, the dome material includes one or more wavelength conversion materials, such as phosphors, that convert some or all of the light emitted into a different wavelength (color).

For short- to mid-wave infrared applications, the dome may be aluminum oxide or aluminum oxynitride. For other wavelengths, the dome can be a ceramic material, for example one made from yttrium aluminum garnet; a composite material such as Plexiglas; or a stiffened fabric.

In an exemplary embodiment, such as the use in short-range missiles, the dome can be a transparent, plastic material like polycarbonate or acrylic. For longer range missiles, the dome can be glass, such as borosilicate or pure silica glass.

These dome corrections can be added to the dome manufacturing process and will not require large changes in design for varied imaging systems or spectral ranges. A version will be the same for every dome of a specific design and a dome with greater correction will be the same for every optical system/distortion type.

Another embodiment includes a method for correcting dome aberrations comprising (a) designing two surfaces of a dome, an outside surface and an inside surface, wherein both surfaces share a major elliptical axis, where the outside surface is defined by its semi-major axis length a and semi-minor axis length b, while the inside surface is defined by its semi-major axis length x and semi-minor axis lengthy, and (b) manufacturing the dome comprising a transmissive material defined by its refractive index n, wherein the dome thickness at the apex, t, is adjusted such that the curvature of the inside surface corrects any aberrations induced by the curvature of the outer surface.

Yet another embodiment includes a method of manufacturing of a dome by correcting for the lensing effects of the outside surface of the dome comprising (a) measuring an outside surface of the dome to obtain a radius of curvature R; (b) measuring a center thickness t of the dome, wherein the dome comprises a material comprising a refractive index n; and (c) manufacturing the inner surface of the dome so that the inside surface of the dome is spherical with a radius of curvature is R−t+t/n.

The apparatus and method described herein are beneficial for use in short-range missiles, missiles that use imaging systems for tracking, and aircraft whose aerodynamic front dome covers an optical, imaging, or radar system. When a dome is used to protect a camera, an imaging system, or another radiation-collection system, the present apparatus can be used to correct for unwanted optical effects, whether introduced by the dome itself or by other optical units, such as the reimaging system in an imager, the processing system in a tracker, or the microwave waveguide systems in a radar.

Alternative embodiments of the subject matter of this application will become apparent to one of ordinary skill in the art to which the present invention pertains without departing from its spirit and scope. It is to be understood that no limitation with respect to specific embodiments shown here is intended or inferred.

I claim:

1. An apparatus for the correction of dome aberrations comprising:
   a dome comprising a curved shell comprising an inside surface and an outside surface;
   wherein the inside and outside surfaces of the dome comprise two separate shapes that combine to form a corrector that improves the quality of the image formed or the information collected by an imaging-system underneath the dome;
   wherein the dome comprises a material capable of transmitting radiation; and wherein the dome comprises an ultraviolet light blocking material, an infrared light blocking material, a visible light blocking material, or mixtures thereof.

2. The apparatus of claim 1 wherein the inside surface of the dome comprises a shape that counteracts aberrations or distortions induced by the outside surface of the dome.

3. The apparatus of claim 1 wherein the dome surfaces comprise conic sections.

4. The apparatus of claim 1 wherein the dome surfaces comprise conic sections that are concentric.

5. The apparatus of claim 1 wherein at least one dome surface comprises a three-dimensional function that is not a conic section.

6. The apparatus of claim 1 wherein at least one of the dome surfaces comprises a localized function applied as a variation to an overall shape function.

7. The apparatus of claim 1 wherein the outside surface of the dome is designed for aerodynamic properties, imaging, radiation-collection properties, or a mixture thereof.

8. The apparatus of claim 1 wherein the dome comprises a material comprising enhanced reflection, transmission, absorption, or mixtures thereof, across some part of the electromagnetic spectrum.

9. The apparatus of claim 1 wherein the dome comprises a spheroidal shape, an ellipsoidal shape, or an ogive shape.

10. The apparatus of claim 1 wherein the dome comprises an uneven thickness.

11. The apparatus of claim 1 wherein the dome comprises a variable thickness.

12. The apparatus of claim 1 wherein the dome comprises an inside surface constructed as a combination of one or more surface patterns.

13. The apparatus of claim 1 wherein the dome comprises one piece or multiple pieces.

14. The apparatus of claim 1 wherein the dome comprises one layer, multiple layers, or a mixture thereof in different locations on the dome.

15. The apparatus of claim 1 wherein the dome comprises one pane or multiple panes.

16. A method for correcting dome aberrations comprising:
(a) designing a dome comprising a curved shell comprising an inside surface and an outside surface;
wherein the inside and outside surfaces of the dome comprise two separate shapes that combine to form a corrector that improves the quality of the image formed or the information collected by an imaging system underneath the dome;
wherein the dome comprises a material capable of transmitting radiation; and
wherein the dome comprises an ultraviolet light blocking material, an infrared light blocking material, a visible light blocking material, or mixtures thereof; and
(b) manufacturing the dome by adjusting a curvature of the inside surface of the dome to correct for any aberrations induced by a curvature of the outer surface.

* * * * *